3,027,316
PROCESS FOR PRODUCING A ZINC
CHROMITE CATALYST
Watson A. Ray, Rock Tavern, N.Y., and Jack Ryer, New Brunswick, N.J., assignors to Texaco Inc., a corporation of Delaware
No Drawing. Filed Dec. 17, 1958, Ser. No. 780,933
10 Claims. (Cl. 208—134)

The present invention relates to improvements in the preparation of hydroforming catalysts and more particularly to the preparation of a zinc oxide-zinc chromite catalyst which is useful in the reforming of petroleum naphthas. The invention is also concerned with catalytic hydroforming processes and a novel catalyst therefor.

It is known that petroleum naphthas can be subjected to a reforming treatment to yield liquid products boiling within the gasoline boiling range and possessing improved octane numbers. A well known and widely used process for upgrading petroleum naphthas is called hydroforming. In hydroforming, the naphtha feed stock is treated at elevated pressures and temperatures of 600°–1100° F. in the presence of a solid catalyst and in the presence of hydrogen or of recycle gas rich in hydrogen. A variety of reactions including dehydrogenation, paraffin and naphthene isomerization, cyclization or aromatization, hydrogenation and hydrocracking occur during hydroforming. All of these reactions contribute to the production of a product of increased value not only because of its higher octane number but also because of its improved cleanliness characteristics due to the elimination of gum-forming unsaturated constituents and the removal of sulfur from sulfur-containing constituents.

It is known that zinc chromite catalysts have been used in upgrading petroleum naphthas for use as motor fuels. It is further known that the metal chromites and particularly zinc chromites have been employed in a wide variety of catalytic processes including the synthesis of oxygenated organic compounds from a mixture of hydrogen and oxides of carbon or in the water gas shift reaction and the like. Such catalysts in the past have been prepared by decomposing metal chromates at atmospheric pressure in a static state.

One known disadvantage of prior art zinc chromite catalysts is that they tend to lose their catalytic activity due to the build-up of carbon deposits thereon in the reforming of naphthas. As a result the spent catalyst must be withdrawn from the reforming operation quite frequently and subjected to a regeneration operation in order to restore the catalytic activity of the catalyst. As is well known in the art, regeneration of spent catalysts brings about a gradual decrease in the useful life of a catalyst. These factors play an important part in the over-all efficiency of a reforming process. A further disadvantage in reforming operations using prior type metal chromite catalysts is that some of the feed stock is converted to less desirable light gases.

We have now surprisingly found that the disadvantages of prior art catalysts can be substantially obviated or materially decreased by the hereinafter described catalyst manufacturing process of the present invention wherein we prepare a zinc oxide-zinc chromite catalyst by decomposing a zinc chromate salt at an elevated temperature such as from about 200°–1000° F., and a superatmospheric pressure such as from about 200–5000 pounds per square inch gauge (p.s.i.g.). Desirably, decomposition is carried out in an agitated pressure vessel such as a rocking autoclave or a rotating kiln.

One advantage of the zinc oxide-zinc chromite catalyst prepared by the process of the present invention is that the catalyst can be prepared in high yields. A further advantage is that the catalyst can be used in reforming of petroleum naphthas for longer periods of time before requiring regeneration, due to the resistance of the catalyst to carbon build-up thereon. A further advantage is that there is less light gas produced in reforming operations with the catalysts prepared by the present invention. Additional advantages flowing from the process of the invention are readily apparent to those skilled in the art from the hereinafter described detailed description.

The zinc chromite catalyst prepared by our process contains two components, namely, zinc oxide and zinc chromite, the zinc chromite component being present in an amount ranging from about 10% to 90% by weight, preferably 25% to 75%, based on the combined weight of the zinc oxide and zinc chromite. Catalysts containing from about 65% to about 75% by weight of zinc chromite are particularly preferred for the most satisfactory results. The zinc oxide-zinc chromite catalyst may be used alone or it may be deposited on a substantially inert catalyst base.

Pressures of from 200 to about 4000 pounds per square inch have also been found to give satisfactory results in the process, while pressures of from about 250 to about 350 p.s.i.g. are desirable.

The use of an inert pressurizing gas such as nitrogen, argon and the like has been employed with satisfactory results.

Preparatory to performing our novel process a master batch hereinafter referred to as "Batch A" was formed in the following manner.

BATCH A

A solution of 4000 grams of zinc nitrate hexahydrate in 8.5 liters of water was prepared. Another solution of 1700 grams of ammonium dichromate in 5 liters of water was mixed with stirring with 1.7 liters of concentrated ammonium hydroxide and 2 liters of water.

Into a mixing vessel containing 2 liters of water there was added slowly, simultaneously and at equal rates, with agitation, the aqueous zinc nitrate solution and the mixed solution of ammonium dichromate and ammonium hydroxide. Stirring was continued for 0.5 hour, then there was added to the blended solution 75 cc. of concentrated ammonium hydroxide to completely precipitate the zinc. The resulting precipitate was washed 5 times by decantation with 10 liters of water, then dried on a steam plate and thereafter sieved through a 20 mesh screen. There was obtained 2528 grams of a yellow powder consisting of basic zinc ammonium chromate which was subsequently processed by our process as follows:

*Example 1*

300 grams of the yellow powder from "Batch A" were placed in an agitated pressure vessel (a rocking autoclave) which was flushed with nitrogen gas, then pressurized with nitrogen until an initial nitrogen pressure of 1000 p.s.i.g. was attained. The temperature of the pressurized vessel was raised gradually until a peak temperature of 708° F. and a peak pressure of 2350 p.s.i.g. was attained. (Decomposition of the powder began at 500° F.) When decomposition was complete, in about 2 hours, the vessel was allowed to cool and the pressure on the vessel was released. There was recovered 280 grams of a medium gray zinc oxide-zinc chromite powder (93.3% yield). The recovered powder was mixed with 5% by weight of a fatty pelleting lubricant sold under the trade name "Sterotex" and pelleted in 5/32 inch dies in a conventional manner. The pellets were then calcined at 1000° F. for 3 hours.

*Example 2*

Following the procedure of Example 1, 300 grams of the yellow powder obtained from "Batch A" were placed in a rocking autoclave which was first flushed with nitrogen then pressurized with nitrogen until an initial nitrogen pressure of 2000 p.s.i.g. was reached. The pressurized vessel was heated, decomposition setting in at 225° F., with a peak temperature of 375° F. being attained. The peak pressure was 4600 p.s.i.g. After cooling to room temperature and permitting the pressure to decrease to atmospheric pressure there was recovered 274 grams of a medium gray zinc oxide-zinc chromite powder (91.3% yield). The recovered powder was pelleted and calcined as described in Example 1.

A second master batch hereinafter referred to as "Batch B" was prepared in a manner similar to the method hereinabove described.

BATCH B

One solution contained 28,536 grams $Zn(NO_3)_2.6H_2O$ in 64 liters of water. The other solution contained 12,144 grams of $(NH_4)_2Cr_2O_7$ in 40 liters of water mixed with 12 liters of concentrated $NH_4OH$ in 16 liters of water. Water was added to the ammonium dichromate-ammonium hydroxide solution in an amount sufficient to make 64 liters of solution. The two solutions were added as hereinabove described to a mixing vessel containing 10 liters of water. Stirring was continued for 1 hour. The supernatant liquid was decanted from the resulting precipitate of basic zinc ammonium chromate and then the precipitate was washed three times with water. The precipitate was dried on a steam plate, sieved through a 20 mesh screen then treated as follows:

*Example 3*

300 grams of the dried precipitate from "Batch B" were placed in an agitated pressure vessel and decomposed as described in Example 1. The decomposed product amounting to 275 grams of zinc oxide-zinc chromite catalyst (91.8% yield basis charge) were recovered containing, by analysis, calculated to 100%, 30.5% by weight zinc oxide, 69.5% zinc chromite. Details of the conditions employed in this example are presented in Table A below. The decomposed product was mixed with 2% Sterotex, pelleted in a 5/32 inch die and calcined at 1000° F. for 4 hours.

*Example 4*

Another 300 gram portion of the "Batch B" precipitate was decomposed in a manner similar to the one described in Example 1. 281 grams of the catalyst were recovered (93.6% by weight yield basis charge). The catalyst contained, by analysis, calculated to 100%, 30.5% zinc oxide and 69.5% zinc chromite. Details of the conditions employed are shown in Table A.

The catalyst was intimately mixed with 2% Sterotex, pelleted in a 5/32 inch die and calcined at 1000° F. for 4 hours.

In order to demonstrate the beneficial results flowing from the novel process of the present invention the following experiment was conducted.

*Example 5*

[Prior Art Method]

A 600 gram sample of the dried precipitate from "Batch B" was decomposed statically at atmospheric pressure. Small portions of the same were heated without agitation in an open 5 liter round bottom flask, provided with a heating mantle, to decomposition temperature of about 640° F., the color changing from yellow to dark gray at this temperature. Approximately 457 grams (76% recovery, basis total charge) of dark gray catalyst powder were obtained. The catalyst contained 26% zinc oxide, 74% zinc chromite. The catalyst was mixed with 2% Sterotex and pelleted in a 5/32 inch die, then calcined at 1000° F. for six hours. Details of the process conditions are shown in Table A together with the conditions for Examples 3 and 4.

TABLE A

| Process conditions | Ex. 3 | Ex. 4 | Ex. 5 (Prior art method) |
|---|---|---|---|
| Time to reach decomposition Temp., Hours | 2.5 | 3 | |
| Decomposition temp., ° F | 364 | 392 | 640 |
| Decomposition Pressure, p.s.i.g | 350 | 250 | atmos. |
| Maximum Temp., ° F | 573 | 516 | |
| Maximum Press., p.s.i.g | 350 | 250 | atmos. |
| Charge, grams | 300 | 300 | 600 |
| Recovered, grams | 275 | 281 | 457 |
| Wt. Percent Loss, Basis charge | 8.2 | 6.4 | 24 |

It is evident from the foregoing data that the novel process of the present invention permits the recovery of the catalyst in considerably improved yields over the prior art process for preparing the catalyst.

The superiority of the catalysts prepared by the process of the present invention for use in catalytic reforming is demonstrated by the following example.

*Example 6*

A naphtha feed stock was reformed under conventional reforming conditions, over a zinc oxide-zinc chromite catalyst containing 26% zinc oxide, 74% zinc chromite prepared by decomposition of basic zinc ammonium chromate in a bomb at a nitrogen pressure of 2000 p.s.i.g. by our process. The results of two duplicate runs I and II are presented in Table B.

By way of contrast, using the same feed stock and reforming conditions as in Example 6, run III was also made using the prior art zinc oxide-zinc chromite catalyst of Example 5 wherein the catalyst was prepared by decomposition of basic zinc ammonium chromate statically at atmospheric pressure in accordance with the prior art method. The catalyst contained 26% by weight zinc oxide, 74% by weight zinc chromite. The data obtained in this run are presented in Table B.

TABLE B

| | Octane Rating, CFFR+ cc. TEL. | Gas Produced, Ft.$^3$ | Coke on catalyst, wt. percent |
|---|---|---|---|
| Catalyst of Example 6: | | | |
| Run I | 99.6 | 0.716 | 3.0 |
| Run II | 99.0 | 0.842 | 2.72 |
| Example 5—Prior Art: | | | |
| Run III | 99.5 | 1.330 | 8.46 |

Inspection of data set forth in Table B clearly demonstrates that the catalysts prepared by the process of the invention are superior to the prior art type catalyst. Although the activity of the two types of catalysts is substantially the same, the improved catalysts of the present invention show a remarkably low quantity of carbon deposited thereon and materially less light gas production. The reduction in carbon deposition is significant because it governs the frequency of regenerating the catalyst with accompanying relatively high costs of compressing air to burn off the carbonaceous deposits at system pressures. The lower quantity of light gases produced is likewise significant since it is an indication that more of the reformer feed was converted to more useful products by using the catalyst of the invention.

Conventional reforming conditions such as temperatures of from about 600° to 1100° F., pressures of from about 0 to 500 p.s.i.g., a space velocity of from about 0.2 to 1 volume of naphtha per volume of catalyst per hour and added hydrogen can be used with the zinc oxide-zinc chromite catalyst of the present invention.

Obviously, many modifications and variations of the invention, as hereinbefore set forth, may be made without departing from the spirit and scope thereof, and there-

We claim:

1. In a process for the preparation of a zinc oxide-zinc chromite catalyst containing from about 10 to 90% by weight of zinc chromite based on the total weight of the zinc oxide and zinc chromite by decomposing discrete particles of a basic zinc ammonium chromate at an elevated temperature, the improvement which comprises decomposing said chromate at a superatmospheric pressure within the range of from about 200 to about 5000 p.s.i.g. in the presence of an inert gas.

2. Process as claimed in claim 1 wherein the pressure is within the range of from about 200 to 4000 p.s.i.g.

3. Process as claimed in claim 1 wherein the pressure is from about 250 to 350 p.s.i.g.

4. Process as claimed in claim 1, wherein the catalyst contains from about 65% to about 75% by weight of zinc chromite, based on total weight of the catalyst.

5. Process as claimed in claim 1 wherein decomposition is carried out at said superatmospheric pressure while moving the discrete particles of basic zinc ammonium chromate.

6. Process as claimed in claim 1 wherein the inert gas is nitrogen.

7. Process as claimed in claim 1 wherein the inert gas is argon.

8. The method of preparing a zinc oxide-zinc chromite hydroforming catalyst containing from about 10 to 90% by weight of zinc chromite based on the total weight of the zinc oxide and zinc chromite which comprises precipitating basic zinc ammonium chromate from an aqueous solution containing zinc nitrate and ammonium dichromate, drying the resulting precipitate at a temperature not substantially above about 212° F. and thereafter decomposing said dried chromate salt to form zinc oxide-zinc chromite at a temperature of from about 200° F. to about 800° F. and at a pressure within the range of from about 250 to 5000 p.s.i.g. in the presence of an inert gas.

9. Process for producing a motor fuel of high octane number which comprises contacting a cracked naphtha fraction with a zinc oxide-zinc chromite catalyst containing zinc chromite in an amount between 65 and 75% by weight, based on the combined weight of the zinc oxide and zinc chromite, at a temperature between about 500 and 1100° F. and a pressure between 0 and 500 p.s.i.g. and a space velocity between 0.2 and 1.0 v./v./hr. in the presence of added hydrogen, said catalyst being prepared by the process claimed in claim 1.

10. A zinc oxide-zinc chromite catalyst containing from about 65% to 75% by weight of zinc chromite, based on the total weight of zinc oxide-zinc chromite, said catalyst being prepared by the process of claim 1.

References Cited in the file of this patent

UNITED STATES PATENTS

| | | |
|---|---|---|
| 1,984,884 | Lazier | Dec. 18, 1934 |
| 2,205,141 | Heard | June 18, 1940 |
| 2,382,881 | Ipatieff et al. | Aug. 14, 1945 |
| 2,658,858 | Lang et al. | Nov. 10, 1953 |
| 2,731,452 | Field et al. | Jan. 17, 1956 |
| 2,772,217 | Nicholson | Nov. 27, 1956 |
| 2,960,460 | Ryer et al. | Nov. 15, 1960 |